(12) United States Patent
Zeichner et al.

(10) Patent No.: US 11,332,402 B2
(45) Date of Patent: May 17, 2022

(54) TEMPERING FRAME FOR THERMAL TEMPERING OF GLASS PANES

(71) Applicant: SAINT-GOBAIN GLASS FRANCE, Courbevoie (FR)

(72) Inventors: Achim Zeichner, Herzogenrath (DE); Peter Schillings, Eschweiler (DE); Romain Debailleul, Villers sur Coudun (FR); Christophe Machura, Chevincourt (FR); Patrick Procureur, Montmartin (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 206 days.

(21) Appl. No.: 16/486,989

(22) PCT Filed: Jan. 11, 2018

(86) PCT No.: PCT/EP2018/050627
§ 371 (c)(1),
(2) Date: Aug. 19, 2019

(87) PCT Pub. No.: WO2018/149566
PCT Pub. Date: Aug. 23, 2018

(65) Prior Publication Data
US 2020/0010352 A1    Jan. 9, 2020

(30) Foreign Application Priority Data

Feb. 20, 2017  (EP) .................................. 17156832

(51) Int. Cl.
*C03B 35/20* (2006.01)
*C03B 27/044* (2006.01)
(Continued)

(52) U.S. Cl.
CPC ........ *C03B 35/207* (2013.01); *C03B 27/0445* (2013.01); *B60J 1/08* (2013.01);
(Continued)

(58) Field of Classification Search
CPC ............. C03B 35/207; C03B 27/044–27/0442
See application file for complete search history.

(56) References Cited

U.S. PATENT DOCUMENTS 2,551,606 A * 5/1951 Jendrisak .............. C03B 23/027
65/107
3,236,621 A * 2/1966 Caswall, Jr. ............ C03B 27/04
65/288
(Continued)

FOREIGN PATENT DOCUMENTS

CN           2782674 Y      5/2006
CN         202226774 U      5/2012
(Continued)

OTHER PUBLICATIONS

International Search Report as issued in International Patent Application No. PCT/EP2018/050627, dated Apr. 9, 2018.
(Continued)

*Primary Examiner* — Erin Snelting
(74) *Attorney, Agent, or Firm* — Pillsbury Winthrop Shaw Pittman LLP

(57) ABSTRACT

A tempering frame for thermal tempering of glass panes, includes a carrier frame and a support frame that is joined to the carrier frame via a plurality of connection elements and is arranged completely within the carrier frame, wherein the support frame has an upper primary surface for placing a glass pane, a lower primary surface, a front edge, and a rear edge, and wherein the support frame has recesses introduced in the rear edge, which are arranged between adjacent connection elements.

17 Claims, 7 Drawing Sheets

Figure 1:
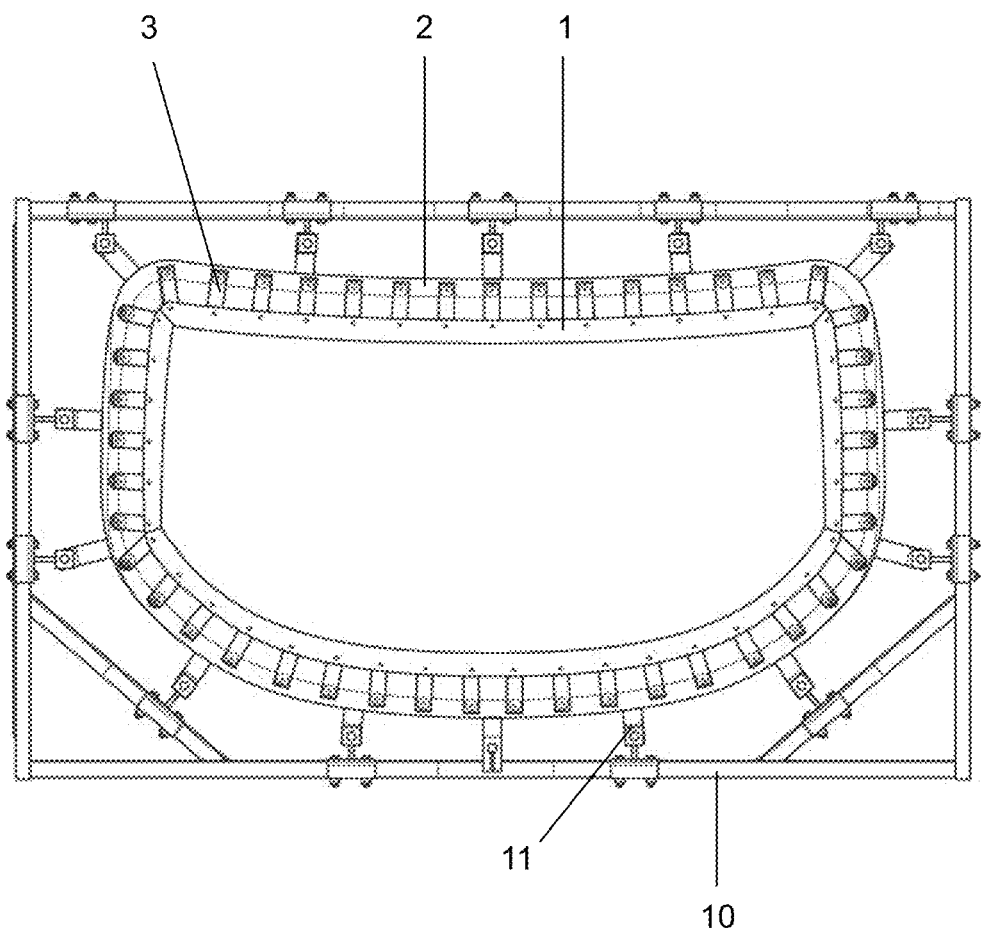

(51) Int. Cl.
*B60J 1/08* (2006.01)
*B60J 1/18* (2006.01)
*B61D 25/00* (2006.01)
*C03B 23/023* (2006.01)
*C03B 40/00* (2006.01)

(52) U.S. Cl.
CPC .............. *B60J 1/18* (2013.01); *B60Y 2200/30* (2013.01); *B61D 25/00* (2013.01); *C03B 23/023* (2013.01); *C03B 40/005* (2013.01)

(56) References Cited

U.S. PATENT DOCUMENTS

| | | | | |
|---|---|---|---|---|
| 3,262,768 | A * | 7/1966 | Carson | C03B 27/0442 65/104 |
| 3,408,173 | A * | 10/1968 | Leflet, Jr. | C03B 23/0252 65/104 |
| 3,484,226 | A * | 12/1969 | Golightly | C03B 23/0252 65/291 |
| 3,762,902 | A * | 10/1973 | Wagner | C03B 27/0442 65/60.2 |
| 3,776,708 | A * | 12/1973 | Seymour | C03B 27/052 65/114 |
| 3,837,833 | A * | 9/1974 | Couture | C03B 23/031 65/288 |
| 3,973,943 | A * | 8/1976 | Seymour | C03B 23/0252 65/348 |
| 4,396,410 | A | 8/1983 | Hagedorn et al. | |
| 4,556,407 | A * | 12/1985 | Fecik | C03B 23/0252 65/273 |
| 4,556,408 | A | 12/1985 | Fecik et al. | |
| 4,661,142 | A * | 4/1987 | Bartusel | C03B 40/005 65/348 |
| 4,749,399 | A * | 6/1988 | Yamada | C03B 23/03 65/273 |
| 5,118,335 | A | 6/1992 | Claassen et al. | |
| 5,135,560 | A * | 8/1992 | Hashemi | C03B 27/0442 65/287 |
| 5,383,950 | A * | 1/1995 | Hashemi | C03B 27/0442 65/288 |
| 5,472,470 | A | 12/1995 | Kormanyos et al. | |
| 5,974,834 | A | 11/1999 | Rijkens et al. | |
| 6,578,385 | B1 | 6/2003 | Tamai et al. | |
| 9,802,856 | B2 * | 10/2017 | Nitschke | C03B 23/03 |
| 2004/0129028 | A1 | 7/2004 | Balduin et al. | |
| 2016/0145140 | A1 | 5/2016 | Szarejko et al. | |
| 2017/0349476 | A1 * | 12/2017 | Machura | C03B 40/005 |

FOREIGN PATENT DOCUMENTS

| | | |
|---|---|---|
| CN | 102795760 A | 11/2012 |
| CN | 202744446 U | 2/2013 |
| CN | 105073658 A | 11/2015 |
| CN | 204939267 U | 1/2016 |
| CO | 05035768 | 4/2005 |
| DE | 710690 C | 9/1941 |
| DE | 808880 C | 7/1951 |
| DE | 1 022 763 B | 1/1958 |
| DE | 1056333 B | 4/1959 |
| GB | 1 210 887 A | 11/1970 |
| JP | S47-000828 B | 1/1972 |
| JP | S52-121620 A | 10/1977 |
| JP | S57-145041 A | 9/1982 |
| JP | S60-108332 A | 6/1985 |
| JP | 2000-327354 A | 11/2000 |
| JP | 2001-048560 A | 2/2001 |
| JP | 2016-514083 A | 5/2016 |
| KR | 10-0367539 B1 | 2/2003 |
| KR | 10-1030886 B1 | 4/2011 |
| RU | 2064458 C1 | 7/1996 |
| SU | 1616861 A2 | 12/1990 |
| WO | WO 93/02017 A1 | 2/1993 |
| WO | WO 2004/026775 A2 | 4/2004 |
| WO | WO 2012/049433 A1 | 4/2012 |

OTHER PUBLICATIONS

Notification of Reason for Refusal as issued in Korean Patent Application No. 10-2019-7024105, dated Jun. 25, 2021.

First Office Action as issued in Chinese Patent Application No. 201880000590.4, dated Jul. 2, 2021.

\* cited by examiner

TEMPERING FRAME FOR THERMAL TEMPERING OF GLASS PANES

CROSS-REFERENCE TO RELATED APPLICATIONS

This application is the U.S. National Stage of PCT/EP2018/050627, filed Jan. 11, 2018, which in turn claims priority to European patent application number 17 156 832.2 filed Feb. 20, 2017. The content of these applications are incorporated herein by reference in their entireties.

The invention relates to a tempering frame for thermal tempering of glass panes and a tempering method carried out therewith.

The thermal hardening of glass panes has long been known. It is frequently also referred to as thermal prestressing or tempering. Merely by way of example, reference is made to the patent documents DE 710690 A, DE 808880 B, DE 1056333 A from the 1940s and the 1950s. A glass pane heated to just below softening temperature is impinged on by a stream of air that results in rapid cooling (quenching) of the glass pane. As a result, a characteristic stress profile develops in the glass pane, wherein compressive stresses predominate on the surfaces and tensile stresses in the core of the glass. This influences the mechanical properties of the glass pane in two ways. First, the fracture stability of the pane is increased and it can withstand higher loads than a non-hardened pane. Second, glass breakage after penetration of the central tensile stress zone (perhaps by damage from a sharp stone or by intentional destruction with a sharp emergency hammer) does not occur in the form of large sharp edged shards, but rather in the form of small, blunt fragments, significantly reducing the risk of injury. Due to the above-described properties, thermally tempered glass panes are used in the vehicle sector as so-called "single-pane safety glass", in particular as rear windows and side windows.

During tempering, so-called "blow boxes" (quench boxes, quench heads) are used, to which a stream of air is supplied by strong fans. In the blow box, the stream of air is divided into various channels that are in each case completed with a nozzle bar. The nozzle bars have a side surface with a row of blowing openings or nozzle openings that are aimed at the glass pane and impinge on it with the stream of air distributed by means of the blow box. The glass pane is typically transported between an upper and lower blow box; the blow boxes are then brought near each other and near the pane surfaces for tempering. The entire apparatus with the two blow boxes is frequently referred to as a tempering station.

During tempering, the glass panes are mounted and transported on so-called "tempering frames". The tempering frame is adapted to the respective pane geometry and usually exchangeably suspended in a transport rack. A tempering frame typically comprises a carrier frame, which is attached to the transport rack, and a support frame, onto which the glass pane is placed. The carrier frame and the support frame are joined to one another via a plurality of adjustment screws in order to be able to adapt the precise shape of the support frame to the respective pane curvature. The adjustment screws are, for that purpose, distributed at certain intervals over the entire perimeter of the frame such that the height of each region of the support frame associated with an adjusting screw can be precisely adjusted.

In conventional tempering frames, the carrier frame and the support frame are arranged one above another. This results in a tall overall structure that is arranged between the two blow boxes during tempering. This yields a minimum distance between the blow boxes and thus between the blow box and the associated pane surface in each case, below which it is impossible to go. The tempering efficiency, which depends substantially on the distance of the blow boxes from the pane surfaces, is limited thereby. A tempering frame of this type is known, for example, from U.S. 5,118,335A or WO2012049433A1.

Also known are tempering frames in which the carrier frame and the support frame are offset locally, wherein, in plan view, the support frame is arranged completely within the carrier frame, for example, from U.S. Pat. No. 4,556,408A or U.S. 5,472,470A. With such a principle, it is possible to arrange only the support frames between the blow boxes, whereas the carrier frames with the adjusting screw remain outside, with the support frame connected to the adjusting screw via a connection element extending outward from the space between the blow boxes. As a result, the minimum distance between the blow boxes can be reduced and the tempering efficiency increased. Higher tempering efficiency can produce higher tensions or produce a given tempering profile while saving energy. However, it has been found that the local decoupling of the carrier frame and the support frame results in low sensitivity in the adjustment of the shape of the support frame using the adjustment screws. One rotation of the adjusting screw results in a smaller change in the shape of the support frame such that the support frame is less efficiently adaptable to the pane curvature.

The object of the present invention is to provide an improved tempering frame that allows a small distance of the blow boxes and with which the shape of the support frame is nevertheless efficiently adjustable.

The object is accomplished according to the invention by a tempering frame in accordance with the independent claim 1. Preferred embodiments are evident from the dependent claims. Tempering frames have long been in use for mounting and transporting glass panes during thermal tempering. This is understood to mean a frame-like or ring-like device on which the peripheral side edge of the glass pane is placed and which is typically exchangeably attached on a transport rack. Since the tempering frame is adapted to the respective shape of the glass pane type to be tempered, the same transport racks can be used for different pane types, wherein with a change in pane type, only the tempering frame needs to be exchanged. However, it is also customary to adapt the shape of the transport rack roughly to the pane type such that each pane type to be tempered is associated with its own specific type of transport racks.

The tempering frame according to the invention for thermal tempering of glass panes includes a carrier frame and a support frame. The support frame is joined to the carrier frame via a plurality of connection elements and, in plan view, is arranged completely within the carrier frame. The carrier frame and the support frame are thus arranged offset relative to one another, with the carrier frame completely framing the support frame. The carrier frame and the support frame are thus spatially decoupled, so to speak, and connected to one another via the connection elements bridging the space between them, with the connection elements preferably connected in each case to the support frame by a space-saving attachment screw and to the carrier frame by an adjusting screw. Then, during tempering, only the support frame together with the glass pane can be arranged in the space between the blow boxes, whereas the carrier frame together with the adjusting screw remains outside. As a result, the blow boxes can be brought closer to the pane surfaces and the tempering efficiency can be increased.

The adjusting screws are used to raise or lower the region associated with the support frame relative to the carrier frame. By raising or lowering an adjusting screw, the region of the support frame that is delimited by the two adjacent adjusting screws is reshaped. The more adjusting screws (and connection elements) present along the support frame, the more precisely adjustable its shape.

The arrangement of the support frame within the carrier frame refers only to the plan view—the two frames need not be arranged in the same height plane. If the support frame and the carrier frame are projected onto a common plane, the projection of the support frame is arranged completely within the projection of the carrier frame.

In the context of the invention, the terms "support frame" and "carrier frame" are used to describe their basic shape as frame-like or ring-like devices, in contrast, for example, to a full-surface active surface that comes into contact with the entire glass pane. The "frames" need not necessarily be continuous but can also have discontinuities.

The support frame is typically composed of a plurality of strip-like pieces of sheet metal, but can, in principle, also be implemented in one piece. The support frame has an upper primary surface, a lower primary surface opposite the upper primary surface, and at least two side edges extending between the primary surfaces, namely, a front edge (front side edge), which faces the glass pane in the intended use, and a rear edge (rear side edge), which faces away from the glass pane and faces the carrier frame. If the support frame is composed of multiple subsections, each subsection has, moreover, two end surfaces.

The upper primary surface of the support frame is provided for placing the glass pane to be tempered, more precisely stated, for placing a peripheral edge region of the glass pane, in particular a peripheral side edge of the glass pane. In the intended use, the front edge of the support frame is thus situated below the glass pane and points toward its center. It is possible to define, on the upper primary surface, a glass pane contact line that corresponds to the position of the peripheral side edge of the glass pane to be tempered in the intended use in plan view on the upper primary surface. This glass-pane contact line is typically arranged within the half of the upper primary surface adjacent the front edge. Thus, the upper support surface can be roughly divided along its width into two halves, wherein the half adjacent the front edge serves for supporting the glass pane and the half adjacent the rear edge serves for attachment to the carrier frame.

According to the invention, the support frame has recesses, introduced in the rear edge and arranged between adjacent connection elements. In other words, the rear edge is not straight, but has recesses, incisions, or cutbacks between adjacent connection elements (or between the screw holes provided in the support frame for mounting the connection elements). In the context of the invention, "recess" means an incision or cutback relative to the hypothetical side edge that results from the line connecting the typically periodically occurring, mostly projecting regions of the rear edge, typically in the overlapping region with the connection elements. Preferably, the rear edge has in each case, in the overlapping region with the connection elements, a straight section, wherein the totality of said sections lie in a line that corresponds to the hypothetical side edge with respect to which the recesses are defined.

The invention is based on the realization that the adjustability of the support frame can be improved by weakening the structure of the support frame, as it were. This is achieved by the recesses according to the invention. As a result, the support frame becomes more flexible and less rigid such that it reacts more sensitively to the adjustment of the adjusting screw. The support frame can then be adapted more efficiently to the curved shape of the glass pane. This is the major advantage of the invention. Moreover, the recesses reduce the flow resistance that opposes the stream of air during tempering, which is advantageous for the tempering result. In addition, the total material of the tempering frame is reduced such that it can store less heat.

The effect according to the invention is, of course, most pronounced when the support frame has as many recesses as possible, i.e., when at least one recess is arranged in each case between each pair of adjacent connection elements. However, the inventive concept can also be realized with fewer recesses. In an advantageous embodiment, recesses are arranged between at least 50% of the adjacent connection elements (meaning that at least 50% of all pairs of adjacent connection elements have a recess between the two connection elements), preferably between at least 70%, particularly preferably between at least 80%, most particularly preferably between at least 90%, in particular 100%. It is also conceivable for only part of the support frame to be outfitted with the recesses according to the invention. Thus, a support frame can be realized that has, depending on the pane geometry, regions that have to have adjustment capabilities and are, consequently, outfitted with the recesses in addition to regions that have to be adjusted less and are implemented conventionally. In this case, the aforementioned preferred percentages refer only to the regions implemented according to the invention.

The width of the support frame is preferably from 10 mm to 100 mm, particularly preferably from 20 to 80 mm. In a particularly advantageous embodiment, the support frame has a very small width of at most 50 mm, preferably from 20 mm to 40 mm. As a result, the flexibility of the support frame and thus its adjustability is further increased. Moreover, space and material can be saved. The term "width" refers to short dimension of the upper and lower primary surface between the front and rear edge and perpendicular to said edges.

The support frame preferably has a thickness from 1 mm to 10 mm, particularly preferably from 2 mm to 5 mm. the term "thickness" means the dimension along the front and rear edge between the upper and lower primary surface and perpendicular to said primary surface. The thickness can also be referred to as the material thickness of the sheet metal forming the support frame.

The support frame preferably contains aluminum or steel and is preferably made of said materials. These materials are readily processable such that the support frame can be produced advantageously; and they result in advantageous stability of the support frame in long-term use, being temperature stable in particular. The processing of the support frame during production of the tempering frame according to the invention typically includes bending the support frame into the desired three-dimensional shape as well as introducing the recesses according to the invention and any other cutouts or design elements, for example, using a laser cutting or water jet cutting.

With regard to the shape of the recesses, there is, in principle, no restriction; and it can be selected by the person skilled in the art according to the requirements of the individual case but also, for example, according to aesthetic criteria. The recesses can, for example, have a rectangular, triangular, or circular segment-like shape or even combinations thereof.

The depth of the recesses is preferably at least 10% of the width of the support frame, particularly preferably at least 20%. In an advantageous embodiment, the recesses have a depth from 10% to 70% of the width of the support frame, preferably from 20% to 50%. With typical widths of the support frame, the depth of the recess is, for example, from 5 mm to 20 mm. The term "depth" means how far the recess extends into the support frame starting from the hypothetical original rear edge.

The recesses have, in an advantageous embodiment, a width of at least 50% of the distance between the adjacent connection elements, preferably of at least 70%, particularly preferably of at least 90%. This is particularly advantageous for the adjustability of the support frame. The width of the recesses can be, in a particularly advantageous embodiment, 100% of the distance between the adjacent connection elements. The width of the recesses is measured substantially perpendicular to the width of the support frame. If the width is not constant over the entire depth, the maximum value is used as the basis.

In a particularly advantageous embodiment, the width of the recess decreases with increasing depth, preferably continuously and monotonically. This advantageously causes a particularly uniform distribution of force during adjustment of the support frame by means of the adjustment screws. The recesses particularly preferably have a curved or arched outline. This yields, so to speak, a wavelike course of the remaining side edge that results in particularly good results, as the inventors have discovered. The width is measured in this case at the hypothetical rear edge without recesses, i.e., along the connecting line between the farthest projecting points that delimit the recesses and are typically arranged in the region of the adjacent connection elements. The recesses can have a curved outline with a constant radius of curvature (as in the case of a circular segment), a curved outline with a variable radius of curvature, but the same direction of curvature (such as, for instance, in the case of an elliptical segment), or even a curved outline with a variable radius of curvature and a variable direction of curvature (as in the case of a shape that can be described approx. with a cosine function). The cosinusoidal recess is the most preferred because it results in particularly advantageous force distribution and in a particularly gentle wave profile that can be advantageously produced and handled.

It is, of course, particularly advantageous for all recesses to have the above-described designs. However, their advantages are also evident when only part of the recesses are implemented accordingly. Advantageously, at least 50% of the recesses have the above-described preferred designs, preferably at least 70%, particularly preferably at least 90%, and most particularly preferably 100%.

The connection elements have in each case a first attachment section, a second attachment section, and a connecting section extending between the two attachment sections. The first attachment section overlaps the support frame and is connected thereto, preferably by means of a screw (attachment screw) that is guided through a screw hole in the first attachment section. The second attachment section overlaps the carrier frame and is connected thereto, preferably by means of a screw (in particular, an adjusting screw) that is guided through a screw hole in the second attachment section.

The length and width of the sections of the connection element can be freely selected by the person skilled in the art according to the requirements in the individual case. Thus, of course, the length and width of the attachment sections must take into account the size of the screws used, whereas the length of the connecting section depends substantially on the desired distance between the carrier frame and the support frame.

The distance between the carrier frame and the support frame in plan view (more precisely, the distance between the projections in the same plane) is, for example, from 1 cm to 15 cm, preferably from 3 cm to 10 cm. In this region, the distance is large enough that the carrier frame can remain outside the space between the blow boxes, but, on the other hand, is not so large that the stability of the support frame would be adversely affected by lever effects of excessively long connection elements. Excessively long connection elements would, moreover, adversely affect the adjustability of the support frame.

In an advantageous embodiment, the the first attachment section and the second attachment section are widened relative to the connecting section. Thus, on the one hand, wide support surfaces for the attachment of the support frame and carrier frame and, thus, a stable connection are ensured; whereas, on the other hand, the connecting section, which is arranged mostly or completely in the space between the carrier frame and the support frame, is advantageously narrow, as a result of which material and weight can be saved and the air circulation, which is critical for the tempering efficiency, is impaired less. Preferably, the width of the two attachment sections is more than 20 mm and the width of the connecting section is less than 20 mm.

In another advantageous embodiment, the first attachment section and the connecting section have substantially the same width; and the second attachment section is, in contrast, widened.

The support surface for the support frame on the connection element is thus further reduced, as a result of which the connection element stabilizes the support frame less. The consequence is even more sensitive adjustability. Preferably, the width of the second attachment section is more than 20 mm, and the width of the connecting section and of the first attachment section is less than 20 mm.

The connection elements can, for example, be made of steel or aluminum. The mutual spacing between adjacent connection elements is preferably from 5 mm to 100 mm, particularly preferably from 10 mm to 50 mm. As a result, advantageous stability and adjustability are achieved. The term "spacing" refers to the distance between the boundaries of the connection elements facing one another, i.e., the width of the space remaining free between the connection elements, measured in the center between the carrier frame and the support frame.

It is, of course, particularly advantageous for all connection elements to have the above-described preferred embodiments. However, their advantages also become evident when only part of the connection elements are implemented accordingly. Advantageously, at least 50% of the connection elements have the above-described preferred embodiments, preferably at least 70%, particularly preferably at least 90%, and most particularly preferably 100%.

The support frame has a shape that corresponds substantially to the outline of the glass pane to be tempered. The shape of the support frame is, consequently, corresponding to the shape of customary motor vehicle window panes, in plan view, roughly polygonal, for example, rectangular, trapezoidal, or triangular, with the side edges often slightly curved compared to the polygon in the strictest sense. The support frame is typically constructed from multiple subsections that are in each case associated with one side of the polygon. In the case of a rectangular or trapezoidal pane, the support surface is, for example, constructed from four straight or slightly curved sections that are combined to the shape of the rectangle or the is trapezoid.

Each of the subsections of the support frame can be connected to the carrier frame via its own specific connection elements. In a preferred embodiment, adjacent subsections have a common connection element, with which they are connected to the carrier frame. The common connection element can, for example, be H-shaped and can be attached with two screws on the carrier frame and with one screw in each case on each subsection of the support frame. The common connection element is advantageously roughly Y-shaped, with one arm connected to the carrier frame and the two other arms connected in each case to one of the adjacent subsections. Since the connection element has only a single adjusting screw, the ends of the two subsections facing one another can only be adjusted together such that adjustment freedom is limited. The advantage, however, resides in significantly increased stability. In particular, disruptive vibration of the support frame 1 can be avoided.

In a preferred embodiment, the tempering frame is suitable for being able to exchange separate connection elements and subsections of the support frame adjacent a common connection element. For this purpose, the carrier frame has screw holes for both two separate connection elements (two screw holes) for adjacent subsections as well as a common, preferably Y-shaped connection element (one screw hole).

In an advantageous embodiment, the support frame has, in addition to the recesses according to the invention, further openings, which can also be referred to as holes or passages and are arranged such that, in the intended use, the edge of the glass pane to be tempered comes to rest on the openings. The openings are preferably arranged along the entire support frame with the least possible distance between them. The glass pane is supported by the regions of the support frame between the openings, which can be selected as small as possible. The openings enable air circulation, which is advantageous for the tempering efficiency. In addition, the side edge of the glass pane can, as a result of the openings, be impinged on directly by air, by which means the pane is cooled more homogeneously and bothersome so-called "edge stresses" of the tempered glass pane can be avoided and thus its stability is improved.

The front edge and/or the rear edge can have locally limited projections. These should make up less than 30% of the edge in question, i.e., not substantially determine the position of the edge. Such projections can, for example, serve for stretching a fabric on the support frame.

The invention also includes a device for thermal tempering of glass panes. The device includes a first blow box and a second blow box that are arranged opposite one another such that their nozzles face each other. The blow boxes are spaced apart such that a glass pane can be arranged between them. Typically, the nozzles of the first blow box (upper blow box) point downward and the nozzles of the second blow box (lower blow box) point upward. Then, a glass pane can advantageously be moved in a horizontal position between the blow boxes.

By means of the blow boxes, the surface of the glass pane can be impinged on by a stream of gas and cooled thereby. The blow boxes have an inner hollow space into which a stream of gas can be introduced by means of a gas supply line. The stream of gas is typically produced by a fan or a plurality of fans connected in series. Starting from the hollow space, the stream of gas is divided into a plurality of channels each of which ends in a so-called "nozzle bar" that has a plurality of nozzles via which the stream of gas can exit the blow box. The blow box thus divides the gas stream out of the gas supply line with a relatively low cross-section via the channels and nozzles to a large active area. The nozzle openings constitute discrete gas exit points that are, however, present in a large number and uniformly distributed such that all regions of the surface are cooled simultaneously and uniformly such that the pane is provided with homogeneous tempering.

The device preferably also includes means for changing the distance between a first and a second blow box. Thus, the blow boxes can be moved relatively toward and away from one another. After the glass pane has been moved between the blow boxes while they are spaced farther apart, the distance between the blow boxes and thus to the glass pane is reduced, by which means a stronger gas stream can be generated on the glass surface.

The design of the blow boxes and their gas channels and nozzle bars is preferably adapted to the shape of the pane to be tempered. The nozzle openings of one blow box span a convexly curved surface; and the nozzle openings of the opposing blow box, a concavely curved surface. The degree of curvature is also governed by the shape of the pane. During tempering, the convex blow box faces the convex surface of the pane; and the concave blow box, the concave surface. Thus, the nozzle openings can be positioned closer to the glass surface, thus increasing the tempering efficiency. Since the panes are usually transported to the tempering station with a concave surface facing upward, the upper blow box is preferably is convex and the lower blow box is concave.

The device also includes means for moving a glass pane, that are suitable for moving a glass pane into the intermediate space between the two blow boxes and out of said intermediate space again. For this, for example, a rail, roller, or conveyor belt system can be used. The means for moving the glass pane include a transport rack, in which a tempering frame according to the invention suspended. The glass pane is mounted during transport and during tempering on a the tempering frame. During tempering, the transport rack is typically moved periodically so the nozzles of the blow box are not aimed at the same points of the glass pane over the entire period of time.

The tempering frame according to the invention enables a shorter distance between the two blow boxes. In a preferred embodiment, the distance between the blow boxes in the close state during tempering is less than 90 mm, particularly preferably less than 70 mm, most particularly preferably less than 50 mm.

The invention also includes an arrangement for thermal tempering of glass panes, comprising the device according to the invention and a glass pane arranged between the two blow boxes.

The invention also includes a method for thermal tempering of glass panes, wherein (a) a tempering frame according to the invention, on whose support frame a heated glass pane is arranged, is moved between a first blow box and a second blow box, wherein the glass pane is arranged areally between the blow boxes such that the two primary surfaces can be impinged on by a stream of gas;

(b) the two primary surfaces of the glass pane are impinged on by means of the two blow boxes by a stream of gas such that the glass pane is cooled.

The tempering mold is preferably suspended in a transport rack, which is transported between the blow boxes by movement means such as rollers, rails, or a conveyor belt. Preferably, the blow boxes are brought near one another after the glass pane has been arranged between them. Thus, the distance between the nozzle openings and the pane surface is reduced and the tempering efficiency is increased.

The impingement on the pane surfaces by the gas stream is done by introducing a gas stream into the inner hollow space of each blow box, dividing it there, and guiding it, uniformly distributed, onto the pane surfaces. The gas used for cooling the glass pane is preferably air. The air can be actively cooled within the tempering device for increasing the tempering efficiency. However, typically, air is used that is not specially temperature controlled by active measures.

The pane surfaces are preferably impinged on by the gas stream for a period of 1 s to 10 s.

The glass pane to be tempered is made, in a preferred embodiment, of soda lime glass, as is customary for window panes. The glass pane can, however, also contain or be made of other types of glass such as borosilicate glass or quartz glass. The thickness of the glass pane is typically from 0.2 mm to 10 mm, preferably 0.5 mm to 5 mm.

In an advantageous embodiment, the method according to the invention immediately follows a bending process in which the glass pane, flat in the initial state, is bent. During the bending process, the glass pane is heated to softening temperature. The tempering process follows the bending process before the glass pane is significantly cooled. For this, the glass pane is transferred after the bending process or in the last step of the bending process from the bending tool onto the tempering mold. Thus, the glass pane does not need to be heated again specifically for tempering.

Curved, tempered panes are common, in particular in the vehicle sector. The glass pane to be tempered according to the invention is, consequently, preferably provided as a window pane of a vehicle whole, particularly preferably a motor vehicle, and, in particular, a passenger car.

The invention also includes the use of a glass pane tempered with the method according to the invention in means of transportation for travel on land, in the air, or on water, preferably as a window pane in rail vehicles or motor vehicles, in particular as a rear window, side window, or roof panel of passenger cars.

In the following, the invention is explained in detail with reference to drawings and exemplary embodiments. The drawings are a schematic representation and are not true to scale. The drawings in no way restrict the invention.

THEY DEPICT

Figure 2:
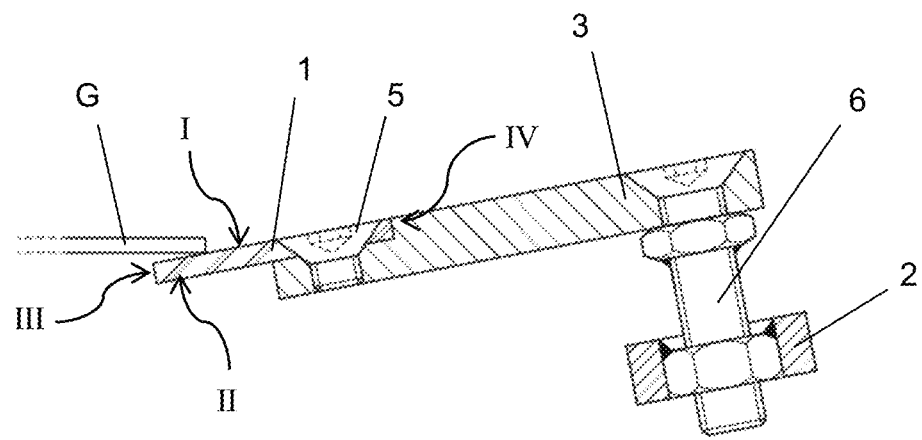
Figure 3:
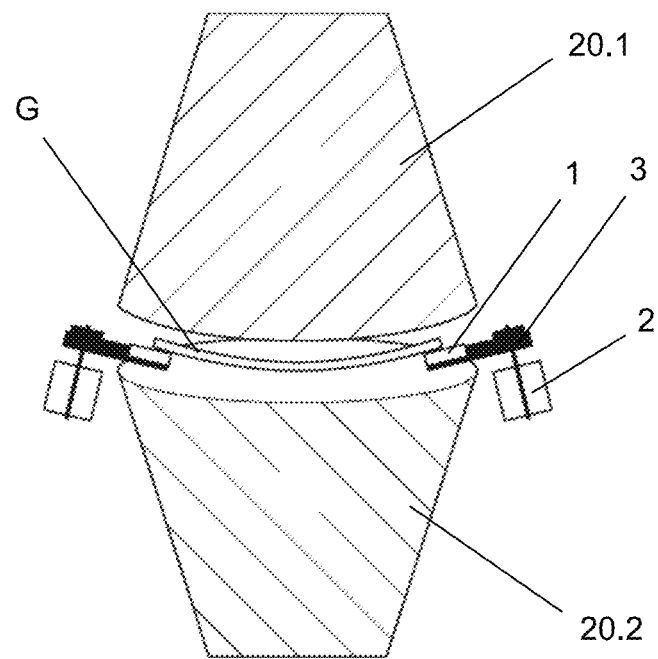
Figure 4:
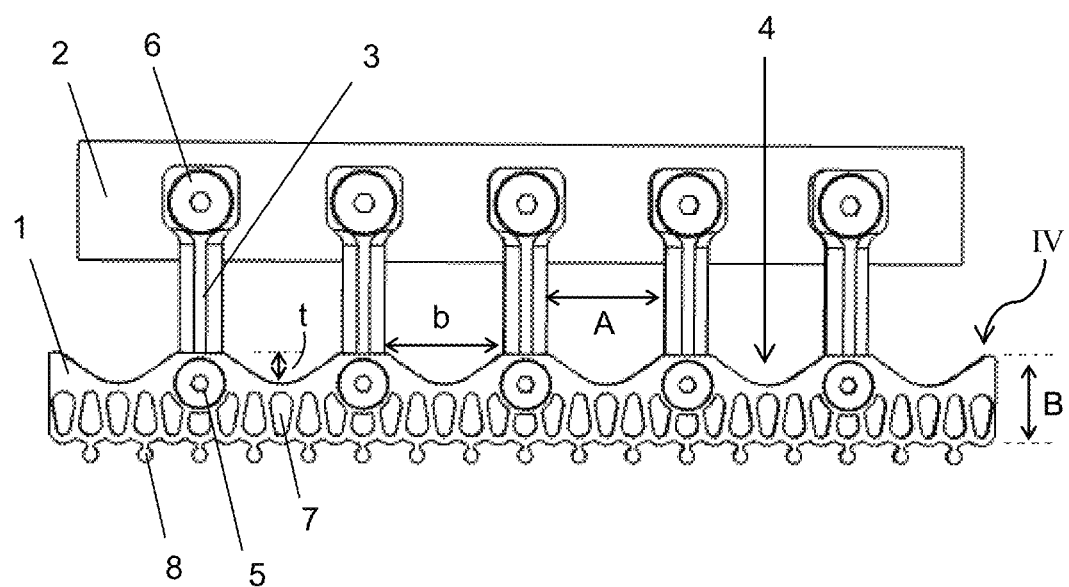
Figure 5:
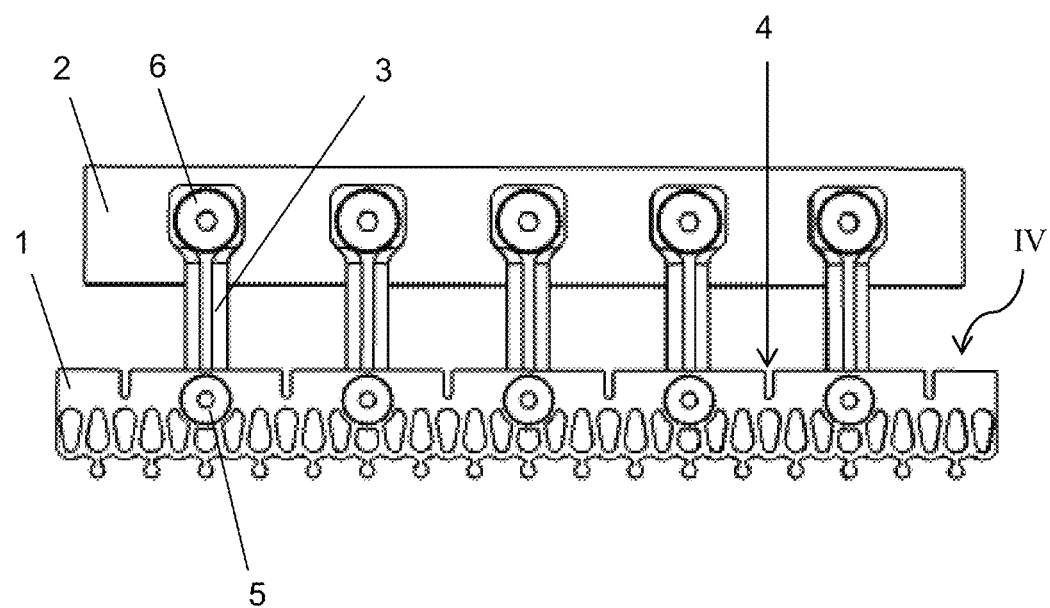
Figure 6:
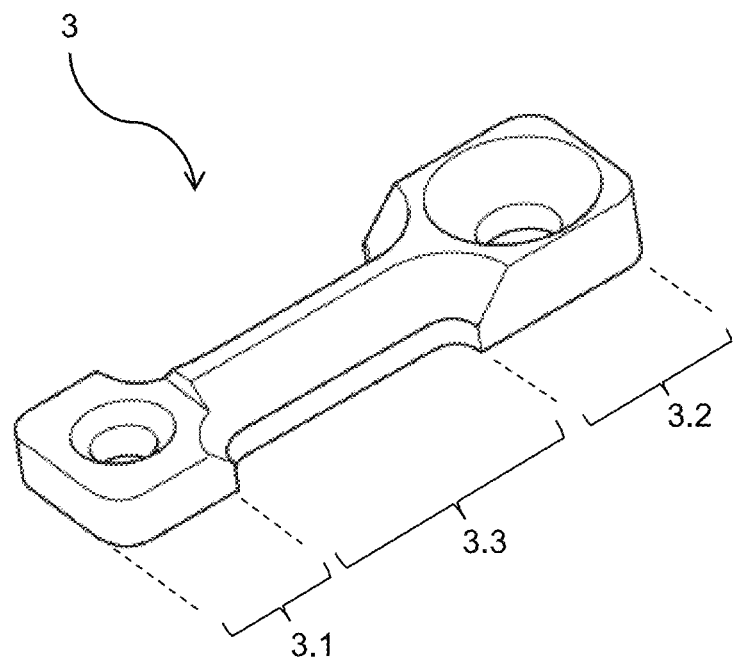
Figure 7:
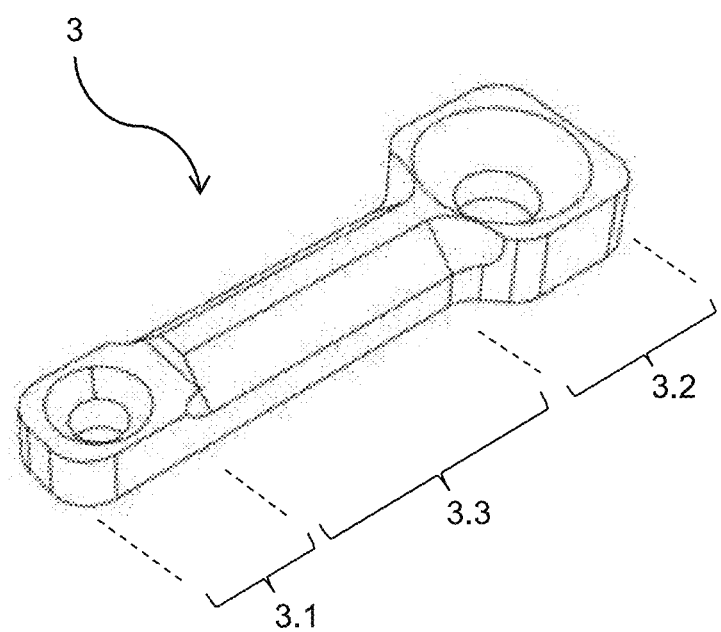
Figure 8:
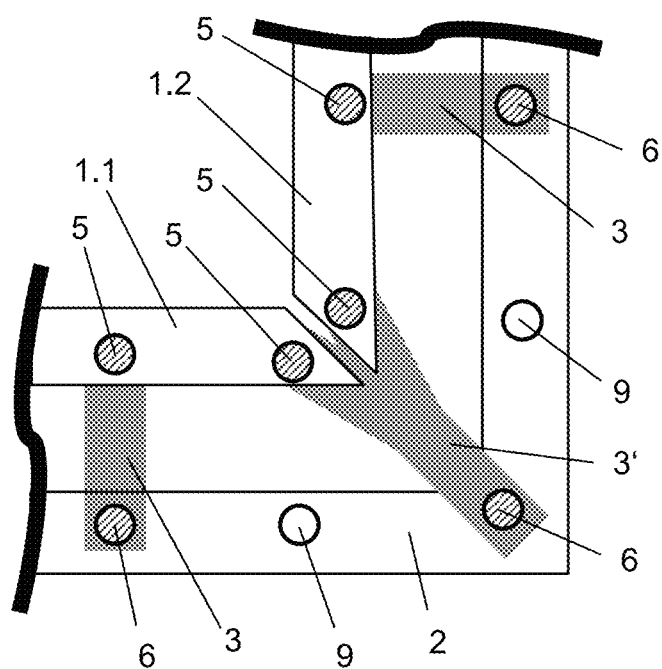
Figure 9:
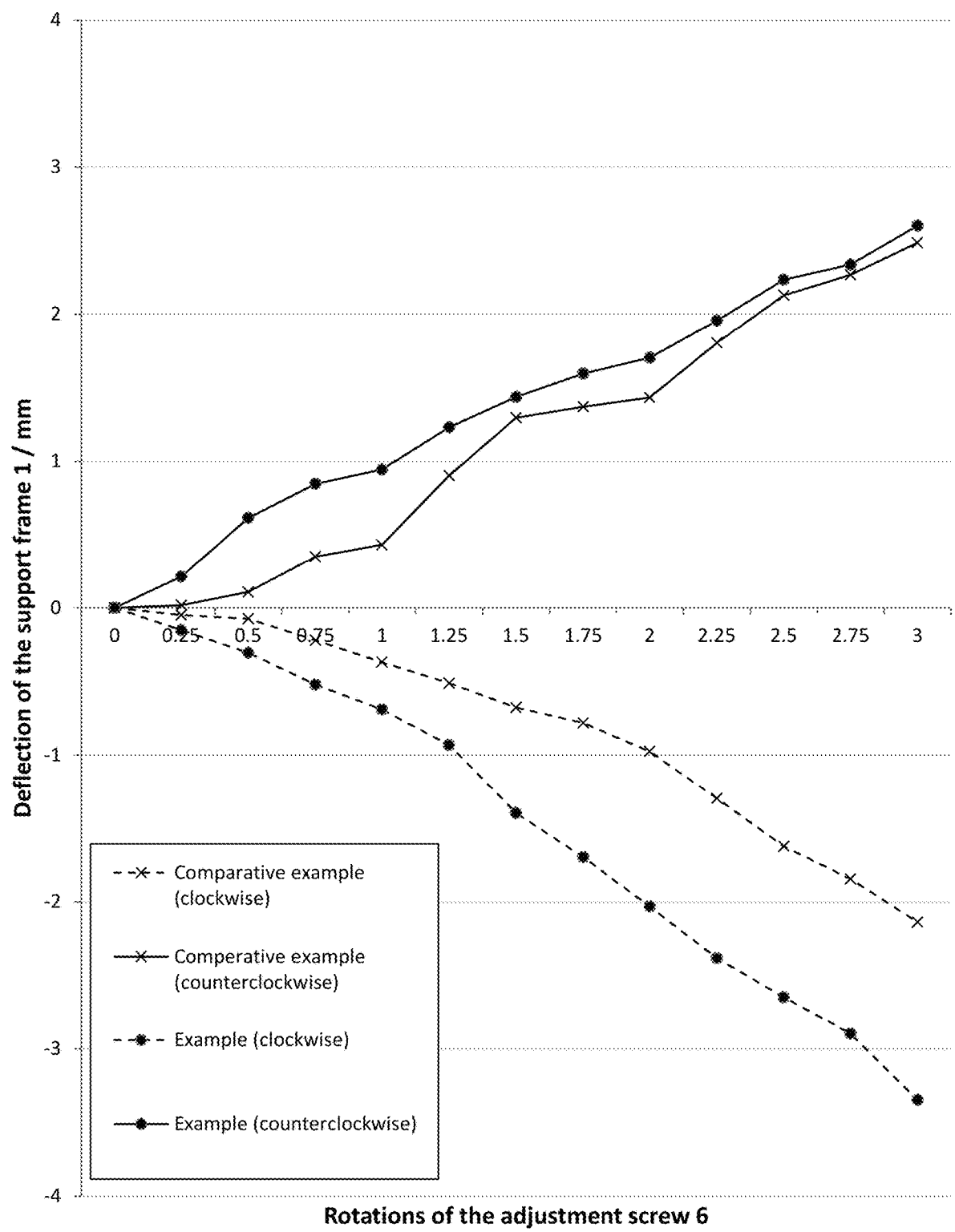
Figure 10:
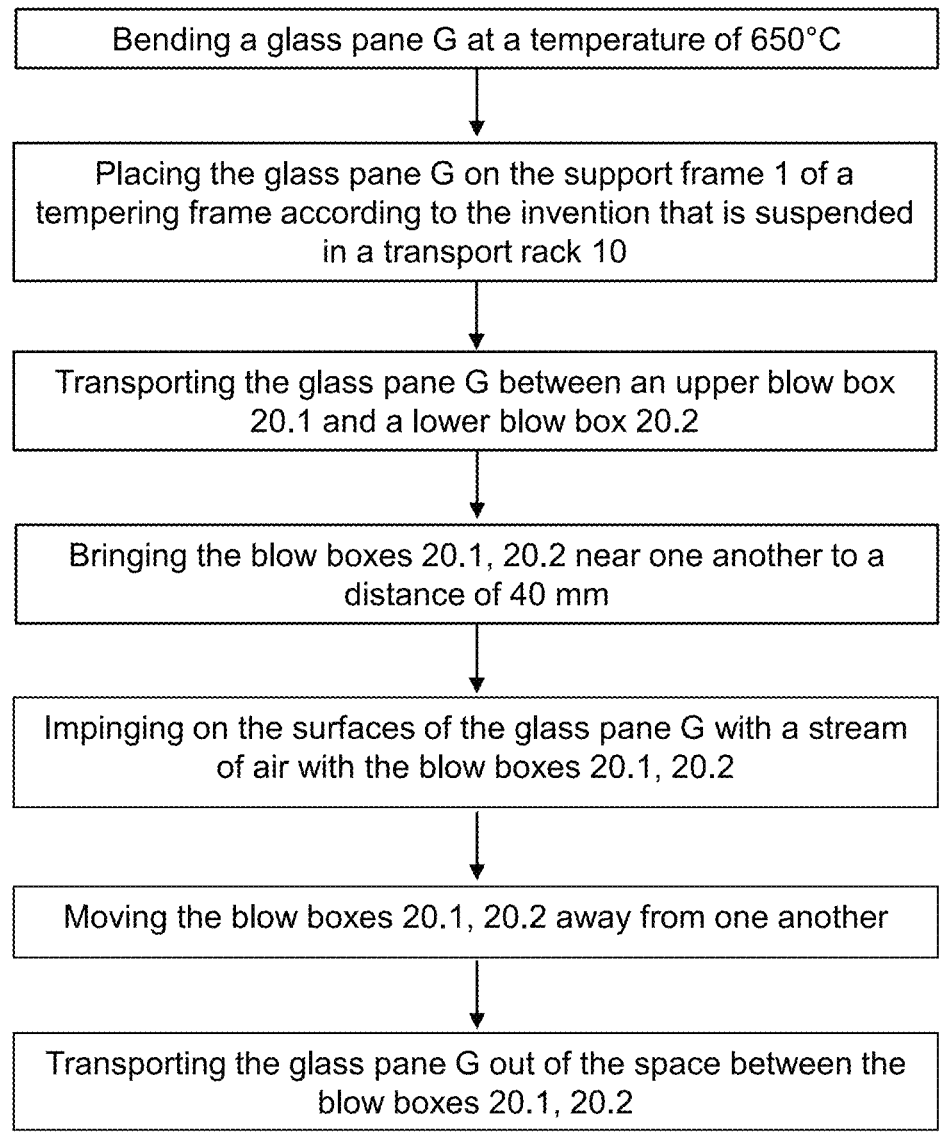

FIG. 1 a plan view of an embodiment of the tempering frame according to the invention, FIG. 2 a cross-section through the tempering frame of FIG. 1, FIG. 3 a cross-section through an arrangement for thermal tempering of glass panes with the tempering frame of FIG. 1, FIG. 4 a plan view of a section of an embodiment of the tempering frame according to the invention, FIG. 5 a plan view of a section of another embodiment of the tempering frame according to the invention, FIG. 6 a perspective view of an embodiment of the connection element 3, FIG. 7 a perspective view of another embodiment of the connection element 3, FIG. 8 a plan view of a section of a tempering frame according to the invention, FIG. 9 a graph of the deflection of the support frame 1 as a function of the operation of the adjusting screw 6, and FIG. 10 a flowchart of an embodiment of the method according to the invention.

FIG. 1 depicts a top plan view of a tempering frame according to the invention. The tempering frame comprises a support frame 1 and a carrier frame 2. The support frame 1 is, in plan view, arranged completely within the carrier frame 2 and is surrounded by the latter. The carrier frame 2 and the support frame 1 are connected to one another by a plurality of connection elements 3.

The tempering frame is attached in a transport rack 10 by means of a plurality of attachment elements 11. The transport rack 10 has, for this purpose, a frame-like attachment region, which can be seen in the figures, and to which the attachment elements 11 are attached. On the sides of the tempering frame, the attachment elements 11 are mounted on the carrier frame 2. The attachment elements 11 can include adjusting screws or similar adjustment capabilities, by means of which the shape of the tempering frame can already be roughly adjusted to the pane geometry.

During thermal tempering, a glass pane is placed on the support frame 1 and transported by means, for example, of the roller-mounted transport rack 10 between two blow boxes, where they are impinged on by a stream of air and are thus quickly cooled, resulting in tempering.

For the sake of clear representation, the recesses 4 according to the invention are not depicted in the figure—they are evident from the detail in FIG. 4.

FIG. 2 depicts, as a detail, a cross-section through the tempering frame of FIG. 1. It is clearly discernible that the carrier frame 2 and the support frame 1 are not arranged one over the other, as is customary in conventional tempering frames, but are, instead, spatially offset, with the distances between them bridged by the connection element 3. The two end regions of the connection element 3 have in each case a screw hole, as do the support frame 1 and the carrier frame 2. The connection element 3 is connected to the support frame 1 by means of an attachment screw 5, which is sunk as completely as possible in the connection element 3 and support frame 1. The connection element 3 is connected to the carrier frame 2 by means of an adjusting screw 6. By means of the adjusting screw 6, the support frame 1 can be adjusted in its height in the region of the respective connection element 3. By means of the plurality of connection elements 3 with associated adjusting screws 6, the shape of the support frame 1 can be very precisely adapted to the pane geometry.

The support frame 1 has, in cross-section, four side surfaces: an upper primary surface I, opposite a lower primary surface II, as well as a front edge III and a rear edge IV, which extend between the primary surfaces I, II. The upward facing upper primary surface I facing away from the ground serves for placement of the glass pane G to be tempered, which is also indicated in the figure. Only the side edge of the glass pane G makes direct contact with the support frame 1 and defines an imaginary peripheral glass-pane contact line on the upper primary surface I, which is arranged inside the half of the upper primary surface I adjacent the front edge III. The metal fiber fabric that is typically arranged between the glass pane and the support frame is not shown.

FIG. 3 depicts an arrangement according to the invention for thermal tempering of glass panes. The glass pane G is arranged on the support frame 1 between an upper blow box 20.1 and a lower blow box 20.2. By means of the blow boxes 20.1, 20.2, which are outfitted with a plurality of nozzles aimed at the glass pane G, the glass pane G is impinged on by the cooling stream of air, resulting in tempering.

The advantage of the spatial decoupling of the support frame 1 from the carrier frame 2 by means of the connection elements 3 is readily discernible in the figure. Only the support frame 1 is arranged between the blow boxes 20.1, 20.2, whereas the carrier frame 2 remains outside. The space requirement of the tempering frame in the space between the blow boxes 20.1, 20.2 is reduced thereby such that the blow boxes 20.1, 20.2 can be brought much closer to one another and to the glass pane G. As a result, the tempering efficiency is increased.

FIG. 4 depicts a detailed plan view of a section of the tempering frame of FIG. 1. The support frame 1 is connected to the carrier frame 2 via the connection elements 3, which are connected to the support frame 1 by means of attachment screws 5 and to the carrier frame 2 by means of adjusting screws 6. The connection elements are arranged with a mutual distance A between them of, for example, 20 mm, which, however, need not necessarily be constant for all pairs of adjacent connection elements 3.

The support frame 1 has a recess 4, in each case, between adjacent connection elements 3. In the regions in which the support frame 1 overlaps the connection elements 3, the rear edge IV projects forward the most and is implemented as a straight section, with all straight sections lying in a line that defines the hypothetical "original" rear edge. In contrast, the rear edge IV is cut into by the recesses 4. The recesses 4 weaken the structure of the support frame 1 such that it reacts more sensitively to a height adjustment of the adjusting screw 6. The efficiency of the adjustment of the support frame 1 to the shape of the glass pane to be tempered is advantageously increased thereby. This is the major advantage of the present invention.

The width B of the support frame 1, which is made of steel, is, for example, 3 cm and its thickness (material thickness) is, for example, 4 mm. The depth t of the recesses 4 is, at, for example, 1 cm, one third of the width B. The width b of the recesses 4 corresponds to the distance A between adjacent connection elements 3. It is maximum along the hypothetical rear edge and decreases with increasing distance from this hypothetical rear edge, with the recesses 4 curved and approx. cosinusoidal. This yields a kind of wave profile of the rear edge IV, which has proved particularly effective.

The support frame 1 also has drop-like openings 7 near the front edge III, which are arranged alternatingly in terms of orientation. The glass-edge contact line runs above these openings 7. On the one hand, the openings 7 promote air circulation during thermal tempering, which is advantageous for the tempering efficiency since heated air can be discharged more quickly. On the other hand, the openings 7 cause the glass pane edge to also be impinged on by a stream of air, as a result of which stability-increasing edge tension is produced.

The support frame 1 also has periodic attachment projections 8. A metal fabric can be attached on the attachment projections 8, which metal fabric is stretched on the support frame 1 in order to prevent direct contact between the glass pane and the support frame 1 and thereby to protect the glass pane and to thermally isolate the support frame 1 from the glass pane. As is discernible from the figure, projections that are locally quite limited, such as the attachment projections 8, which do not substantially determine the position of the front edge III, are not taken into account in the determination of the width B of the support frame 1. The attachment projections 8 can also be arranged on both sides, i.e., on the front edge III as well as on the rear edge IV.

FIG. 5 depicts another embodiment of the support frame 1 according to the invention. In contrast to the embodiment of FIG. 3, the recesses 4 are implemented as narrow incisions. In this manner as well, the structure of the support frame 1 can be weakened in order to enable more efficient adjustment.

FIG. 6 depicts a preferred embodiment of a connection element 3. It has a first attachment section 3.1, a second attachment section 3.2, and a connecting section 3.3 extending therebetween. The first attachment section 3.1 is screwed to the support frame 1; the second attachment section 3.2, to the carrier frame 2. For this, the two attachment sections 3.1, 3.2 are provided with screw holes that are discernible in the figure.

The connecting section has a width of approx. 15 mm. The two attachment sections 3.1, 3.2 are, in contrast, significantly widened with a width of approx. 25 mm, yielding a bone-shaped appearance. The wide attachment sections 3.1, 3.2 enable a stable connection to the carrier frame 2 and to the support frame 1. The connecting section 3.3, which is arranged in the space between the carrier frame 2 and the support frame 1 and bridges the distance between them, restricts the air circulation through its narrow design less severely than if it had the same width. The connecting section is sloped on both sides such that in the event of glass breakage, the fewest possible glass fragments can remain thereon.

FIG. 7 depicts an alternative preferred embodiment of the connection element 3. The second attachment section 3.2 and the connecting section 3.3 are implemented similar to the embodiment of FIG. 6. The first attachment section 3.1 has, in contrast, the same width as the connecting section 3.3. This provides a smaller support surface for the support frame 1. The connection element 3 thus has a less pronounced stabilizing effect on the support frame 1, which can, consequently, be reshaped more simply and thus can be adjusted by means of the adjusting screws.

FIG. 8 depicts a corner region of a tempering frame according to the invention—i.e., a region that is associated with a corner of the glass pane to be tempered. The glass pane is, for example, a rear window for a motor vehicle that has a roughly rectangular outline. The support frame 1 is implemented not in one piece, but rather is composed of four substantially straight subsections, which are in each case associated with one side of the rectangular glass pane and meet at the corners. The figure depicts such a corner region, in which two subsections 1.1, 1.2 come together. The two end screw holes of the two subsections 1.1, 1.2 are screwed to a common connection element 3' that is attached to the carrier frame 2 with a single adjusting screw 6.

The common connection element 3' increases the stability of the tempering frame, in particular of the support frame 1. However, the flexibility is restricted during adjustment of the shape of the support frame 1, because only a single adjusting screw 6 is available for the ends of the two subsections 1.1, 1.2. Consequently, the carrier frame 2 has two additional, unoccupied screw holes 9, roughly opposite the screw holes for the attachment screws 5 of the support frame 1. For applications in which sensitive adjustment capabilities in the corner areas are particularly important, the common connection element 3' can be exchanged for two separate connection elements 3.

FIG. 9 depicts, by way of example with reference to a graph, the effect of the support frame according to the invention.

EXAMPLE

A tempering frame according to the invention of FIG. 4 was produced. Using a mechanical sensing device, the deflection of the support frame 1 was measured relative to the starting position as a function of the rotation of an adjusting screw 6. The adjusting screw 6 was further adjusted in each case by a quarter turn and the deflection measured. The the two adjacent adjusting screws 6 were readjusted such that the difference in the rotation of the adjusting screw 6 under investigation and the adjacent adjusting screw 6 was in each case a half turn. Two series of measurements were carried out with the adjusting screw adjusted once clockwise and once counterclockwise.

Comparative Example

For comparison, the same measurement was carried out with a tempering frame that was designed just like the tempering frames of the example, but without the recesses 4 according to the invention.

The graph shows that the deflection of the support frame 1 was significantly greater in the example according to the invention. In the case of the support frame 1 according to the invention, the same rotation of the adjusting screw 6 thus results in greater deflection. The support frame 1 according to the invention is thus adjustable with higher sensitivity than a prior art support frame. The effect occurs, in particular, even with small screw rotations (up to one rotation), which are, according to experience, particularly frequent in practice.

FIG. 10 depicts an exemplary embodiment of the method according to the invention for thermal tempering of glass panes with reference to a flowchart.

LIST OF REFERENCE CHARACTERS:

(1) support frame
(1.1), (1.2) subsections of the support frame 1
(2) carrier frame
(3) connection element
(3.1) first attachment section of the connection element 3
(3.2) second attachment section of the connection element 3
(3.3) connecting section of the connection element 3
(3') common connection element of two subsections 1.1, 1.2
(4) recess of the support frame 1
(5) attachment screw between the connection element 3 and the support frame 1
(6) adjusting screw between the connection element 3 and the carrier frame 2
(7) opening of the support frame 1
(8) attachment projection of the support frame 1
(9) unoccupied screw hole
(10) transport rack
(11) attachment element between the transport rack 10 and the carrier frame 2
(20.1) upper blow box
(20.2) lower blow box
(B) width of the support frame 1
(A) distance between adjacent connection elements 3
(b) width of the recess 4
(t) depth of the recess 4
(I) upper primary surface of the support frame 1
(II) lower primary surface of the support frame 1
(III) front edge of the support frame 1
(IV) rear edge of the support frame 1
(G) glass pane

The invention claimed is:

1. Tempering frame for thermal tempering of glass panes, comprising a carrier frame and a support frame that is joined to the carrier frame via a plurality of connection elements and is arranged completely within the carrier frame,
   wherein the support frame has an upper primary surface for placing a glass pane, a lower primary surface, a front edge that faces the glass pane, and a rear edge that faces the carrier frame,
   wherein the support frame has recesses introduced in the rear edge, which are arranged between adjacent connection elements, and
   wherein the recesses are machined in the rear edge of the support frame and extend through a thickness of the support frame defined between the upper and lower primary surfaces so that a width of the support frame varies between two adjacent connection elements.

2. The tempering frame according to claim 1, wherein the recesses are arranged between at least 50% of the adjacent connection elements.

3. The tempering frame according to claim 2, wherein the recesses are arranged between at least 90% of the adjacent connection elements.

4. The tempering frame according to claim 1, wherein the recesses have a depth of at least 10% of a width of the support frame.

5. The tempering frame according to claim 4, wherein the depth is from 20% to 50% of the width of the support frame.

6. The tempering frame according to claim 1, wherein the recesses have a width of at least 50% of a distance between adjacent connection elements.

7. The tempering frame according to claim 6, wherein the recesses have a width of at least 90% of the distance between adjacent connection elements.

8. The tempering frame according to claim 1, wherein a width of the recesses decreases with increasing depth of the recesses and wherein the recesses have a curved outline.

9. The tempering frame according to claim 1, wherein the support frame has a width of 10 mm to 100 mm.

10. The tempering frame according to claim 1, wherein the support frame has a thickness of 1 mm to 10 mm.

11. The tempering frame according to claim 1, wherein the connection elements have, in each case,
    a first attachment section, which is connected to the support frame by an attachment screw,
    a second attachment section, which is connected to the carrier frame by an adjusting screw, and
    a connecting section extending between the first attachment section and the second attachment section.

12. The tempering frame according to claim 11, wherein the first attachment section and the second attachment section are widened compared to the connecting section.

13. The tempering frame according to claim 11, wherein the first attachment section and the connecting section have substantially the same width and the second attachment section is widened compared thereto.

14. The tempering frame according to claim 1, wherein the support frame is composed of multiple subsections and wherein adjacent subsections are connected to the carrier frame by means of a common connection element.

15. The tempering frame according to claim 1, wherein a distance between adjacent connection elements is from 5 mm to 100 mm.

16. Method for thermal tempering of glass panes, comprising:
    (i) moving a tempering frame according to claim 1, on whose support frame a heated glass pane is arranged, between a first blow box and a second blow box;

(ii) impinging on the glass pane a stream of gas by means of the two blow boxes such that the glass pane is cooled.

17. The method according to claim 16, wherein the distance between the blow boxes in step (ii) is less than 90 mm.

\* \* \* \* \*